United States Patent [19]
Jensen

[11] 3,722,129
[45] Mar. 27, 1973

[54] FISHING LURE

[76] Inventor: Jay E. Jensen, 811 Lynwood Street, Raritan, N.J. 08806

[22] Filed: Nov. 20, 1970

[21] Appl. No.: 91,385

[52] U.S. Cl. .............................................. 43/42.03
[51] Int. Cl. .............................................. A01k 85/00
[58] Field of Search...... 43/26.2, 42.03, 42.22, 43.13, 43/9, 42.47

[56] References Cited

UNITED STATES PATENTS

| | | | |
|---|---|---|---|
| 3,305,964 | 2/1967 | Wieszeck | 43/42.03 |
| 2,753,648 | 7/1956 | Paterno | 43/42.03 |
| 2,928,367 | 3/1960 | McCormick | 43/43.13 |

*Primary Examiner*—Warner H. Camp
*Attorney*—Warren B. Kice, Joseph M. Lane, R. L. Aitken and D. R. Dunner et al.

[57] ABSTRACT

A fishing lure in which a transducer is carried by a body member and is responsive to information from the water in which the lure is placed for regulating the position of a pair of fins pivotally mounted to the body member, to control the depth of the fishing lure in the water.

4 Claims, 13 Drawing Figures

PATENTED MAR 27 1973 3,722,129
SHEET 1 OF 2

INVENTOR
JAY E. JENSEN

PATENTED MAR 27 1973 3,722,129

INVENTOR

JAY E JENSEN

FISHING LURE

BACKGROUND OF THE INVENTION

This invention relates to a fishing lure, and more particularly to a fishing lure whose depth can be automatically regulated in response to temperature or pressure of the water.

The desirability of controlling the depth of a fishing lure or fishing bait in water has long been recognized for several reasons. First of all, the depth control will enable a fisherman casting the lure into water a large number of times to cover a large vertical range of water. More important is the fact that the various species of fish stay at different water depths due to temperature stratification of the water. For example, brook trout prefer a depth at which the water temperature range is between 55°–60°, while small-mouth bass prefer a temperature range of 65°–70°, lake trout a temperature range of 45°–55°, etc.

Although several proposals have been made for setting the fishing lure to go to a predetermined depth, such as by adjusting its fin relative to the body portion of the lure, there is no assurance that the temperature stratification at this particular depth is consistent with the type of fish that it is desired to be caught.

SUMMARY OF THE INVENTION

It is therefore an object of the present invention to provide a fishing lure which is responsive to information received from the water to regulate the depth which the lure attains in the water.

Toward the fulfillment of the above object, the present invention comprises a body member, a transducer carried by said body member and responsive to information from the water in which the lure is placed for producing an output, and means carried by said body member and responsive to said output for controlling the depth of said body member in said water.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
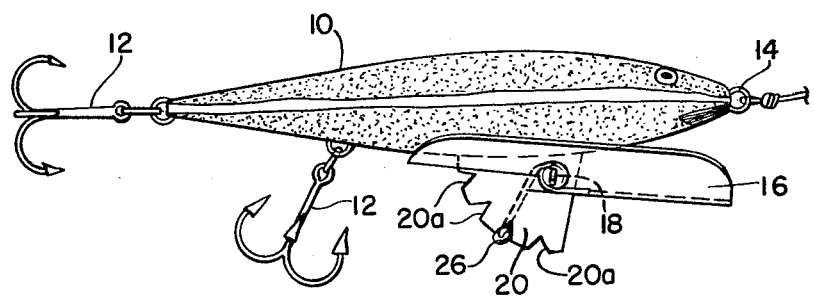
FIG. 1 is a side elevational view of one embodiment of the fishing lure of the present invention.
Figure 2:
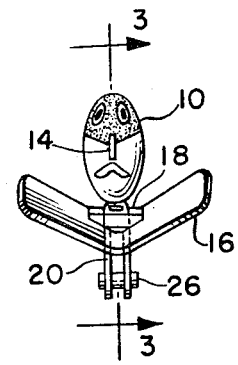
FIG. 2 is a front elevational view of the embodiment of FIG. 1.

In the embodiment of FIGS. 1–6, a fishing lure is formed by a solid body member 10 designed to simulate a small fish such as a minnow or the like. A pair of hooks 12 extend from the body member 10 in a conventional manner, and an eyelet 14 is fastened to the nose portion of the body member to permit a fishing line to be attached thereto. A fin 16 is secured to a shaft 18 journaled through the leg portions of a bracket member 20 having a generally U-shaped cross-section.

Figure 3:
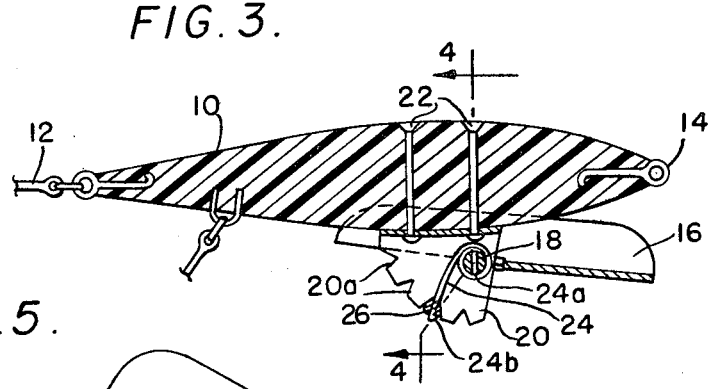
FIG. 3 is a cross-sectional view taken along the line 3—3 of FIG. 2.
Figure 4:
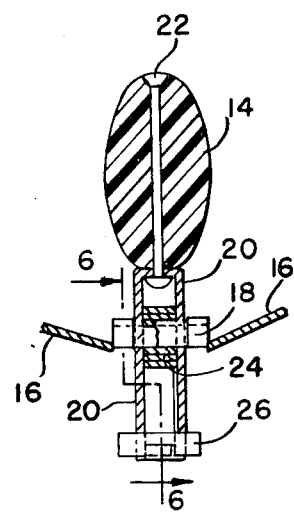
FIG. 4 is an enlarged cross-sectional view taken along the line 4—4 of FIG. 3.

As shown in FIGS. 3 and 4, a pair of rivet-like fasteners 22 extend through the base portion of the bracket member 20 and through the body member 10 to fasten the members together. An elongated bimetallic strip 24 has one end portion 24a extending through an elongated slot formed in the shaft 18 and is wound around the shaft, with its other end extending in a slot formed in a stud 26. The bimetallic strip may be formed in a conventional manner and, in general, consists of two metallic strips secured together with each having a different coefficient of expansion, so that an exaggerated curling of the strip will be effected upon changes in temperature.

A plurality of notches 20a are formed in each leg portion of the bracket member 20, which are adapted to receive the stud 26, so that the stud may be placed in any one of several generally circumferential positions relative to the bracket member.

Figure 5:
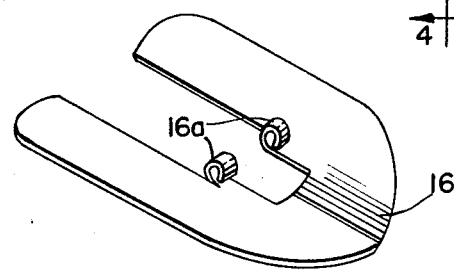
FIG. 5 is an enlarged perspective view of the fin utilized in the embodiment of FIGS. 1–4.
Figure 6:
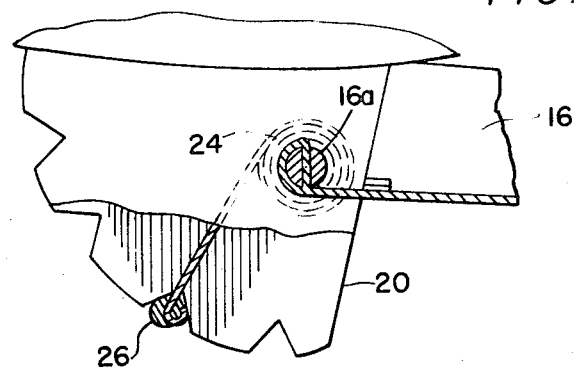
FIG. 6 is an enlarged partial cross-sectional view of the embodiment of FIGS. 1–5.
Figure 7:
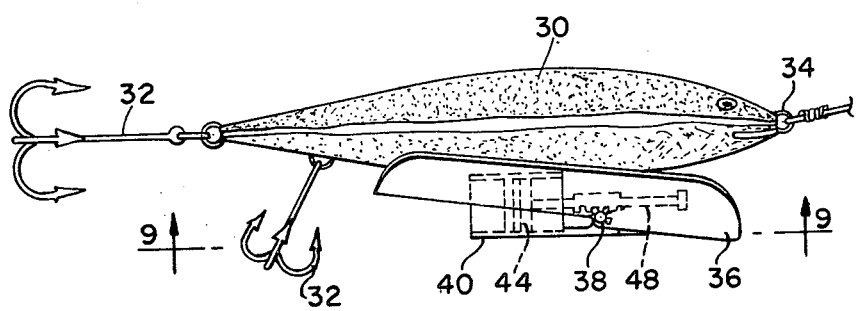
FIGS. 7 and 8 are views similar to FIGS. 1 and 2, respectively, but depict an alternate embodiment of the present invention.
Figure 8:
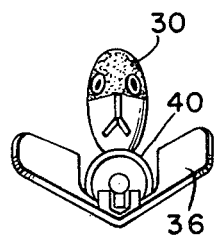
Figure 9:
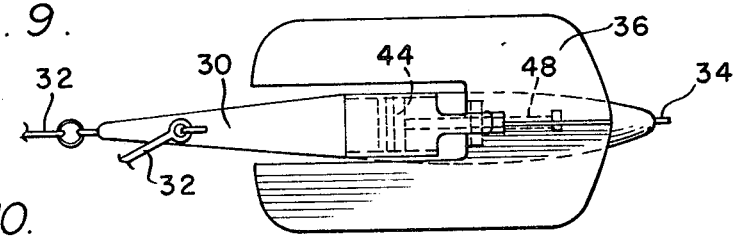
FIG. 9 is a bottom plan view of the embodiment of FIGS. 7 and 8.

As shown in FIG. 5, the fin 16 is generally U-shaped and has two curled portions 16a, the ends of which extend into the elongated slot formed in the shaft 18 to secure the fin to the shaft. The fin 16 is positioned relative to the body member 10 so that it extends generally angularly downwardly in a rear-to-front direction as viewed in FIG. 3, which angular position varies upon rotation of the shaft 18. As a result of this angular position the body member "dives" when placed in a body of water.

In operation the initial angular position of the fin 16 relative to the body member 10 is regulated by placing the stud 26 in one of the notches 20a of the bracket member 20, depending on the particular water depth that the line is to attain, and the body member is cast into the water. The bimetallic strip 24 will expand or contract in response to changes in the water temperature, causing rotation of the shaft 18 and a resulting change in the angular position of the fin 16 relative to the body member 10. Since the temperature of the strip 24 will normally be decreasing as the lure leaves the ambient air and enters the water, and as the lure descends in the water, the strip will contract, and the arrangement is such that such contraction causes rotation of the shaft 18 in a direction that decreases the angular position of the fin 16 relative to the body member 10 until the fin attains a generally parallel position relative to the body member. When the latter occurs, the body member 10 will maintain a predetermined depth in the water as it moves in the water under the control of the fisherman.

It is thus apparent that the body member can thus be programmed to descend into a body of water until the water approaches a predetermined temperature, at which time the lure will level off in the water until removed therefrom.

It is also known that a direct relationship exists between the pressure in a body of water and its depth. For example, at surface depths of 10, 20, 30, and 40 feet the gauge pressure of the water is approximately 4 psi, 8.7 psi, 12.9 psi, and 17.3 psi, respectively.

The embodiment of FIGS. 7–11 is designed to control the depth of the fishing lure without regard to temperature by utilizing the depth-pressure relationship. Specifically, the fishing lure comprises a body member 30 having a pair of hooks 32 extending therefrom, an eyelet 34 fastened to the nose portion thereof, and a fin 36 adapted for pivotal movement with respect to the body member. These components may be identical to the corresponding components of the previous embodiment. The fin 36 is fixed to a shaft 38 which is rotatably mounted relative to a bracket 40. A substantial portion of the bracket 40 is cylindrical, with a lip portion 40a extending from one end thereof, and the bracket is fastened to the body member 30 by means of a pair of rivet-like fasteners 42, as in the previous embodiment.

A piston 44 is slidably mounted in the cylindrical portion of the bracket member 40, with an O-ring 46 being provided to effect a seal. A stem 48 extends from the piston, and a rack 50 is slidably mounted over the stem 48. The rack 50 may be fixed in a plurality of axial positions relative to the stem 48 by means of a nipple 50a projecting from an inner surface of the rack which is adapted to engage in any of four small depressions formed along the axial length of the stem, as better shown in FIG. 11.

Figure 10:
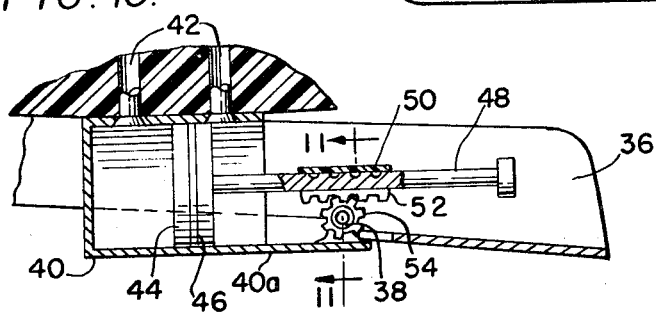
FIG. 10 is a cross-sectional, partial enlarged view of the embodiment of FIGS. 7–9.
Figure 11:
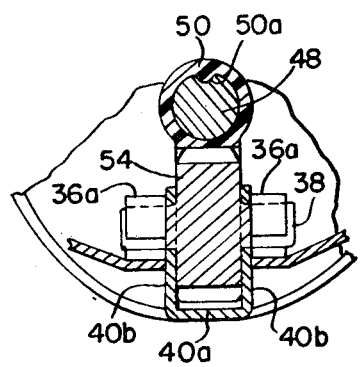
FIG. 11 is an enlarged cross-sectional view taken along the line 11—11 of FIG. 10.

A plurality of teeth 52 are provided on the bottom portion of the rack 50 as viewed in FIG. 10, and are adapted to engage with a pinion gear 54 rotatably mounted through a pair of upwardly extending flanges 40b extending from the lip portion 40a of the bracket member 40. The shaft 38 is fixedly mounted through a bore in the pinion gear 54 for rotation therewith. The fin 36 has two curled portions 36a, the ends of which are fixed in a slot in the shaft 38.

In operation, the rack 50 is moved to a predetermined axial position along the stem 48 according to the depth which it is desired that the body member 30 attain, causing the fin 36 to take a predetermined angular position relative to the body member, and the latter is cast into the water. The water pressure acting on the front end of the piston 46 will cause same to move axially within the cylindrical portion of the bracket 40, thereby causing a rotation of the pinion gear 54 by virtue of its engagement with the teeth 52 of the rack 50. As a result, the fin 36 changes its angular position relative to the body member 30, resulting in varying angles of descent until the fin attains a parallel position relative to the body member, causing the latter to level off and maintain the desired depth.

Figure 12:
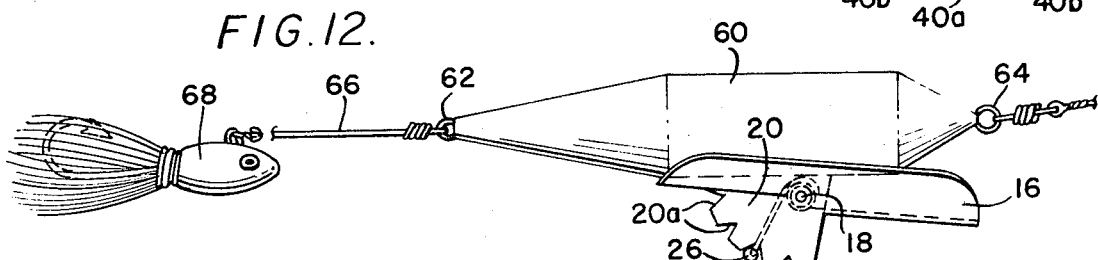
FIGS. 12 and 13 are views similar to FIGS. 1 and 7, but depicting additional alternate embodiments of the present invention.

The embodiment of FIG. 12 is essentially the same as the embodiment of FIGS. 1–6, but incorporates a trolling rig 60 which has a pair of eyelets 62 and 64 mounted at each end thereof. The eyelet 62 receives a line 66 for connecting to a live bait 68 or the like, while the eyelet 64 receives a fishing line in a known manner. The fin 16 of the embodiment of FIGS. 1–6 is fixed to a rotating shaft 18, and the depth of same is regulated by placing the stud 26 in one of the slots 20a of the bracket member 20, as in the latter embodiment. Therefore, if it is desired to troll for fish using live bait on the end of the trolling rig 60, the depth of the latter can be regulated as previously set forth.

Figure 13:
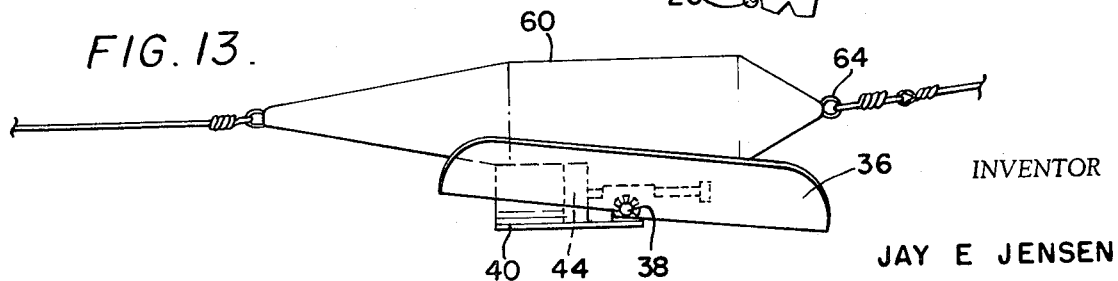

In the embodiment of FIG. 13, the trolling rig 60 is provided with the fin 36 affixed to the rotating shaft 38, the angular position of which is regulated by the piston 44 slidably mounted with respect to the bracket 40, as in the embodiment of FIGS. 7–11.

The use of the trolling rig 60 thus permits a precise depth control without resorting to the use of lead weights or the like which ride on the bottom of the body of water.

Of course, variations of the specific construction and arrangement of the fishing lure disclosed above can be made by those skilled in the art without departing from the invention as defined in the appended claims.

I claim:

1. A fishing device comprising a body member, a coiled bimetallic strip carried by said body member and adapted to expand or contract in response to changes in water temperature, a fin operatively connected to said strip in a manner to move between a predetermined angular position relative to said body member and a position substantially parallel to said body member in response to said expansion or contraction, and means carried by said body member for regulating said predetermined angular position and therefore the depth that said body member will attain in water.

2. The device of claim 1 further comprising a shaft rotatably mounted relative to said body member and connected to said fin, one end of said strip being connected to said shaft in a manner to rotate same in response to said expansion and contraction.

3. The device of claim 2 wherein said regulating means comprises means to adjust the position of the other end of said strip relative to said body member.

4. The device of claim 1 wherein said fin is in the form of an elongated, substantially U-shaped blade having a longitudinal axis parallel to the longitudinal axis of said body member.

* * * * *